United States Patent
Malcolm (10) Patent No.: US 7,263,527 B1
(45) Date of Patent: Aug. 28, 2007

(54) GROUPING SELECTED TRANSACTIONS IN ACCOUNT LEDGER

(75) Inventor: Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/909,340

(22) Filed: Aug. 11, 1997

(51) Int. Cl.
*G06F 17/00* (2006.01)
(52) U.S. Cl. ......................................... 707/102; 705/30
(58) Field of Classification Search ................. 377/13; 705/30, 33; 707/102
See application file for complete search history.

(56) References Cited

U.S. PATENT DOCUMENTS

| | | | |
|---|---|---|---|
| 4,114,027 A | | 9/1978 | Slater et al. ................. 235/419 |
| 4,989,141 A | * | 1/1991 | Lyons et al. |
| 5,117,356 A | * | 5/1992 | Marks |
| 5,134,564 A | * | 7/1992 | Dunn et al. .................. 364/406 |
| 5,181,162 A | * | 1/1993 | Smith et al. ................. 715/530 |
| 5,188,562 A | * | 2/1993 | Carley ........................... 462/54 |
| 5,189,608 A | * | 2/1993 | Lyons et al. |
| 5,212,639 A | * | 5/1993 | Sampson et al. |
| 5,225,978 A | * | 7/1993 | Petersen et al. .............. 705/33 |
| 5,237,498 A | * | 8/1993 | Tenma et al. |
| 5,317,504 A | * | 5/1994 | Nakayama |
| 5,337,263 A | * | 8/1994 | Patermaster ........... 564/705.02 |
| 5,371,680 A | * | 12/1994 | Anno et al. |
| 5,390,113 A | * | 2/1995 | Sampson |
| 5,521,363 A | * | 5/1996 | Tannenbaum ................ 235/379 |
| 5,559,313 A | * | 9/1996 | Claus et al. ................... 705/30 |
| 5,649,115 A | * | 7/1997 | Schrader et al. |
| 5,677,955 A | * | 10/1997 | Doggett et al. ................ 380/24 |
| 5,715,398 A | * | 2/1998 | Lubenow et al. |
| 5,727,161 A | * | 3/1998 | Purcell, Jr. ...................... 705/7 |
| 5,745,883 A | * | 4/1998 | Krist et al. |
| 5,799,286 A | * | 8/1998 | Morgan et al. |
| 5,802,511 A | * | 9/1998 | Kouchi et al. .................. 707/2 |
| 5,815,829 A | * | 9/1998 | Zargar .......................... 705/30 |
| 5,826,241 A | * | 10/1998 | Stein et al. .................... 705/26 |
| 5,832,460 A | * | 11/1998 | Bednar et al. ................. 705/27 |
| 5,842,185 A | * | 11/1998 | Chancey et al. .............. 705/40 |
| 5,842,211 A | * | 11/1998 | Horadan et al. .............. 707/10 |
| 5,857,079 A | * | 1/1999 | Claus et al. ................... 705/33 |
| 5,875,435 A | * | 2/1999 | Brown ......................... 705/30 |
| 5,903,881 A | * | 5/1999 | Schrader et al. .............. 705/42 |
| 6,023,684 A | * | 2/2000 | Pearson ........................ 705/35 |

(Continued)

OTHER PUBLICATIONS

General Ledger 7.0, Dialog Directory listing, Feb. 17, 1997.*
Jack Nimersheim, "Windows Bargains: quicken for Windows," Home-Office Computing (GFHC), v10 n12, p. 44-5, Dec. 1992.*

(Continued)

*Primary Examiner*—Andrew Joseph Rudy
(74) *Attorney, Agent, or Firm*—Jeffrey S. LaBaw; Dillon & Yudell LLP (57) ABSTRACT

At the time transactions are entered into accounting software data records, a user is given the option of creating a transaction group for transactions expected to appear in an external statement as a single entry. A persistent record of the association of selected transactions is maintained in the data records, and a total for transaction groups is displayed to the user during the reconciliation of the data records with the external statement. The user may then easily reconcile multiple entries in the data records which were consolidated in the external statement.

4 Claims, 6 Drawing Sheets

U.S. PATENT DOCUMENTS

| | | | |
|---|---|---|---|
| 6,032,133 A * | 2/2000 | Hilt et al. | 705/40 |
| 6,041,312 A * | 3/2000 | Bickerton et al. | 705/30 |
| 6,134,535 A * | 10/2000 | Belzberg | 705/37 |
| 6,330,546 B1 * | 12/2001 | Gopinathan et al. | 705/35 |
| 6,996,542 B1 * | 2/2006 | Landry | 705/40 |

OTHER PUBLICATIONS

Microsoft Money(R) manual, purchased with the product on May 25, 1995, espacially pp. 39, 88, May 25, 1995.*

Microsoft Money, Personal Financial Organization Made Easy, pp. 1-96 & Contents iii-x, May 25, 1995.*

* cited by examiner

Fig. 1A

*Prior Art*

Fig. 1B

| 1002 | 5/14 | Check from Sis | | 25.00 | |
|---|---|---|---|---|---|
| 34987 | 5/15 | Paycheck | | 1816.72 | |
| 00100 | 5/15 | Tax refund | | 542.17 | |
| 22213 | 5/15 | Mail-in rebate | | 3.00 | |
| 34988 | 5/31 | Paycheck | | 1816.72 | |

*Fig. 2A*

| 1002 | 5/14 | Check from Sis | ✓ | 25.00 | |
|---|---|---|---|---|---|
| 34987 | 5/15 | Paycheck | ✓ | 1816.72 | |
| 00100 | 5/15 | Tax refund | ✓ | 542.17 | |
| 22213 | 5/15 | Mail-in rebate | ✓ | 3.00 | 2361.89 |
| 34988 | 5/31 | Paycheck | | 1816.72 | |

GROUPING SELECTED TRANSACTIONS IN ACCOUNT LEDGER

BACKGROUND OF THE INVENTION

1. Technical Field

The present invention relates in general to accounting software including personal finance managers and in particular to reconciliation of external statements with accounting software records. Still more particularly, the present invention relates to a method and apparatus for reconciling external statements to groups of transactions within accounting software records.

2. Description of the Related Art

Financial transactions are commonly recorded in data processing systems using software accounting packages. Examples include personal finance managers such as Quicken, Microsoft Money, and Minding Your Money. In such personal finance managers, users record transactions such as checks, deposits, and automatic teller machine withdrawals. The personal finance manager software typically includes functions for balancing accounts and reconciling the records to bank statements received by the user.

A problem arises in the reconciliation process where an external statement consolidates multiple transactions recorded separately in the accounting software. Often a deposit or other financial transaction is entered as multiple separate entries in a user's accounting software ledger. For example, a user with 10 checks to deposit will enter the checks individually in the ledger for auditing, tracking, budget management, and other reasons.

When the deposit is made at the financial institution, however, such as the user's bank or credit union, only one deposit entry is entered into the account for the total deposit amount. When reconciling the account, the account statement contains only a single deposit amount that does not match any deposit amount in the software ledger. The customer must manually total individual unmatched entries via calculator or hand calculation to determine which combination of multiple entries matches the single statement entry.

Another common situation where multiple transactions may be consolidated and create problems for account reconciliation is payment of invoices. Frequently businesses will pay several invoices received for goods or services with a single check, or may pay for specific items within an invoice rather than paying the entire invoice. The invoicing entity is then required to determine to which outstanding invoices or items within an invoice a received payment is to be applied.

A further, unrelated problem in personal finance managers arises from the limited capability of users to group transactions for special treatment. Most personal finance managers allow transactions to be categorized for the purposes of budgeting or expense tracking. For example, users may classify transactions as mortgage or auto payments for the purposes of viewing such categories separately as a portion of total expenses.

Generally, however, transactions may not be grouped independently of the categories for the purposes of detailed analysis. For example, a user may wish to group fixed recurring expenses, such as mortgage and auto payments, and variable recurring expenses, such as groceries and dry-cleaning, separately for the purposes of manipulating a monthly budget.

An additional consideration is introduced by the fact that personal finance managers are evolving. Traditional personal finance managers are designed to operate on standalone data processing systems with transactions manually entered and reconciled by the user, although some personal finance managers are beginning to offer support for electronically downloading transactions and partial reconciliation between local and bank ledgers. Additionally, banks are beginning to offer electronic services for accounts via dialup access, such as "PC Banking," a service offered by Nations-Bank Corporation. Moreover, efforts are being made—by the consortium Integrion, for example—to establish electronic banking services over the Internet.

In view of the proliferation of such electronic banking services, it is anticipated that personal finance managers will be augmented to provide new features. One feature anticipated is more fully automated account reconciliation between a bank's records and a user's local account ledger. To provide such a feature, however, a mechanism for reliably correlating transactions should be established to minimize the user involvement required in the reconciliation.

It would be desirable, therefore, to provide a method and apparatus for facilitating reconciliation of external account statements or records with local accounting software ledgers where multiple entries may be consolidated within the external statement or records. It would further be advantageous to provide a method of grouping transactions within an accounting software ledger for purposes other than account reconciliation.

SUMMARY OF THE INVENTION

It is therefore one object of the present invention to provide improved accounting software.

It is another object of the present invention to provide an improved method of reconciling external statements or records with local accounting software records.

It is yet another object of the present invention to provide an improved method and apparatus for reconciling external statements or records to groups of transactions within local accounting software records.

The foregoing objects are achieved as is now described. At the time transactions are entered into accounting software data records, a user is given the option of creating a transaction group for transactions expected to appear in an external statement as a single entry. A persistent record of the association of selected transactions is maintained in the data records, and a total for transaction groups is displayed to the user during the reconciliation of the data records with the external statement. The user may then easily reconcile multiple entries in the data records which were consolidated in the external statement.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
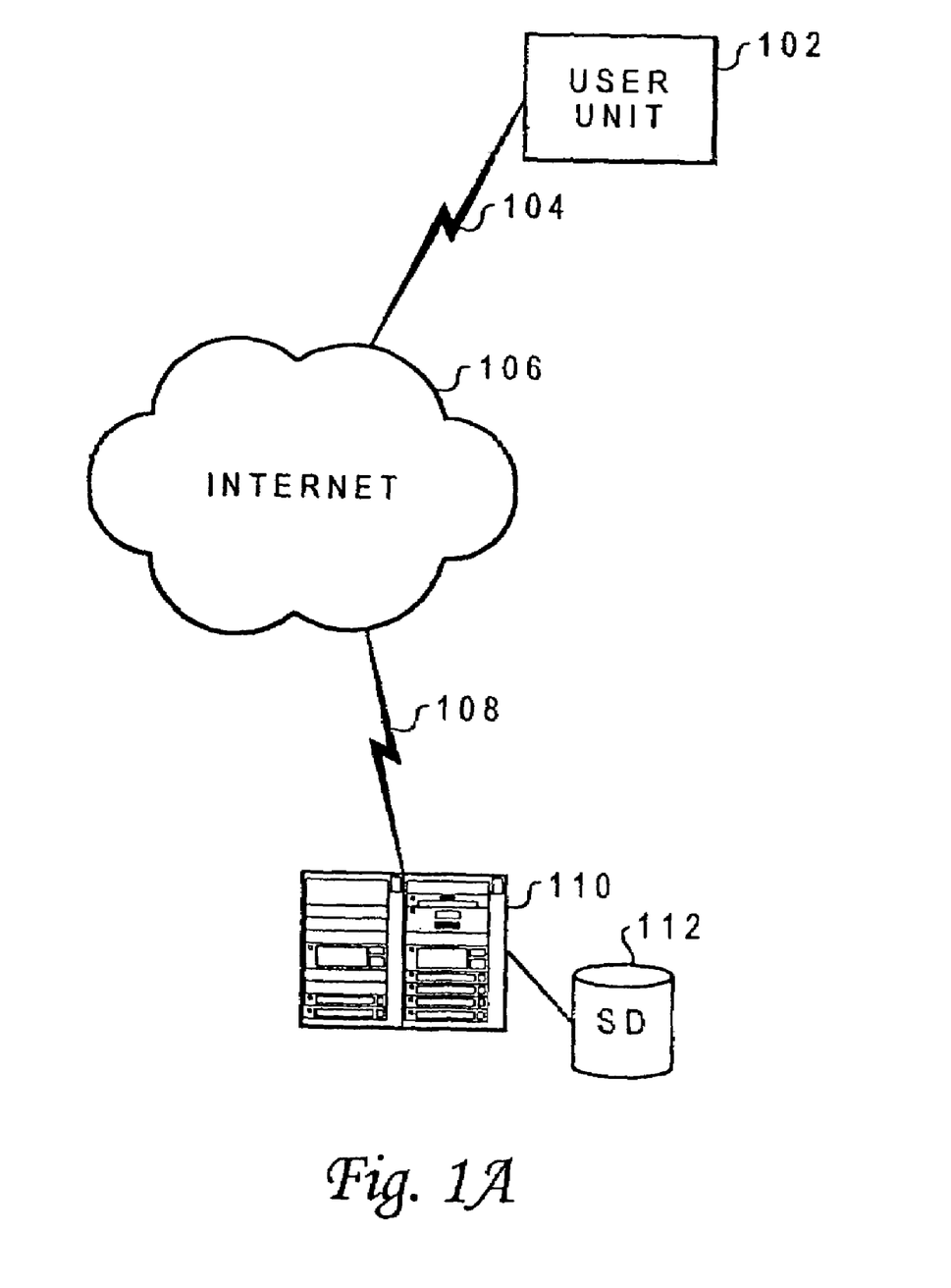
FIGS. 1A-1B depict a network and data processing system in which a preferred embodiment of the present invention may be implemented.

With reference now to the figures, and in particular with reference to FIG. 1A, a network in which a preferred embodiment of the present invention may be implemented is depicted. The network includes a user unit 102 connected via communications link 104 to the Internet 106 and acting as an Internet client. Communications link 104 may, for example, be provided in the form of access service by an Internet Service Provider (ISP). Also connected to Internet 106 via communications link 108 is Internet server 110, which includes a storage device 112 such as a hard disk drive.

In the exemplary embodiment, Internet server 110 functions as a World Wide Web (WWW) server employing the HyperText Transmission Protocol (HTTP) to provide access to data formatted in the HyperText Markup Language (HTML) to Internet clients such as user unit 102. Such data—units of which are colloquially referred to as "Web pages"—may include text, graphics, and forms for querying databases. The data may be passed via a series of servers within Internet 106 to user unit 102, and thus appropriate security measures should be provided.

Internet server 110 in the exemplary embodiment is employed to provide customers of a banking institution with access to account records maintained on storage device 112. Software operated on user unit 102, server 110, or both operates in accordance with the present invention to permit creation of group transactions for account reconciliation or other purposes.

Although an embodiment utilizing the Internet has been depicted for the purposes of describing the invention, those skilled in the art will recognize that the present invention may be employed in other types of networks, including networks in which access to a server maintaining account records is provided through direct dial-up access to the server.

Figure 1B:
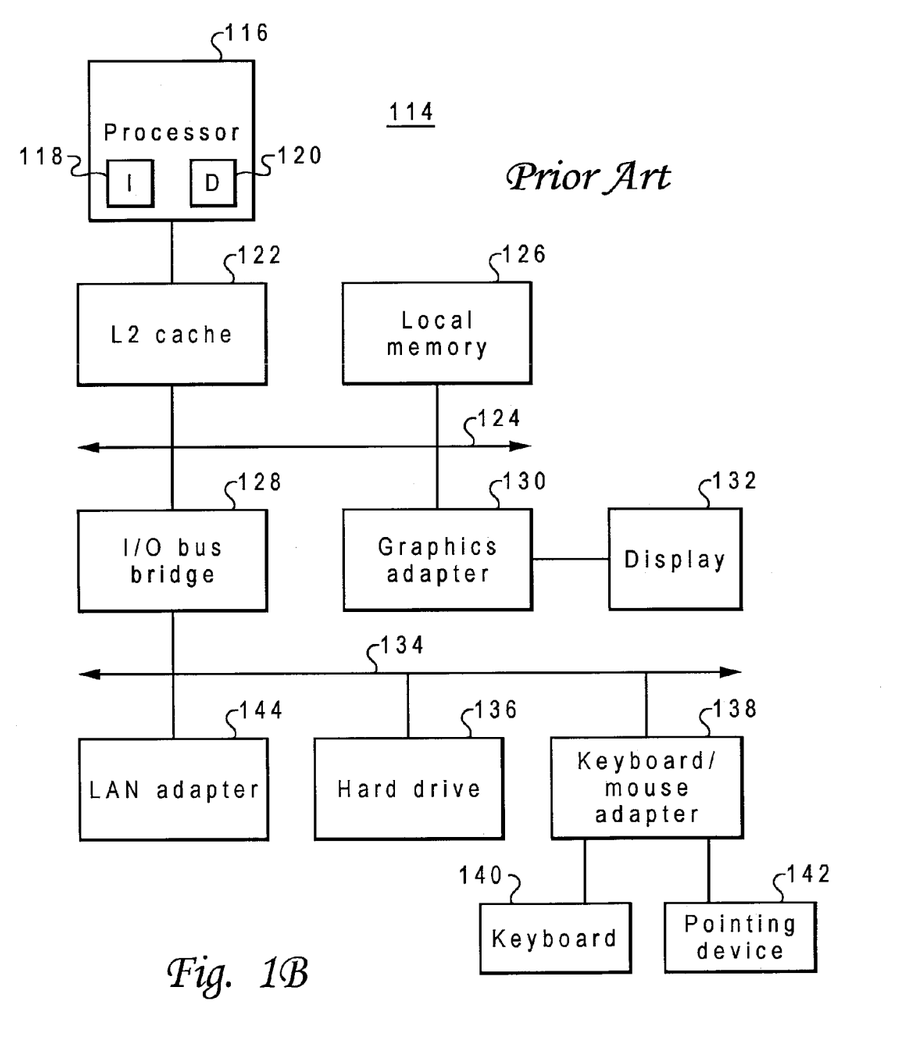

FIG. 1B depicts a data processing system in which a preferred embodiment of the present invention may be implemented. Data processing system 114 may be employed as user unit 102 within the network depicted in FIG. 1A, or as server 110. Modifications to the embodiment depicted may be appropriate depending on how data processing system 114 is utilized. Alternatively, data processing system 114 may be employed as a stand-alone unit in which the present invention may be implemented.

Data processing system 114 includes a processor 116 having internal level one data and instruction caches 118 and 120. Processor 116 is connected to a level two (L2) cache 122, which is connected via system bus 124 to system memory 126 and to bridge 128. Memory mapped devices, such as graphics adapter 130 connected to display unit 132, may also be connected to system bus 124.

Bridge 128 connects system bus 124 to input/output (I/O) bus 134. Various peripherals may be connected to I/O bus 134, such as hard disk drive 136. Keyboard/mouse adapter 138 connected to I/O bus 134 allows a keyboard 140 and pointing device 142 such as a mouse or trackball to be connected to data processing system 114. Network adapter 144 connected to I/O bus 134 allows data processing system 114 to be connected to a local area network (LAN) or the Internet.

The operation of data processing system 114 is well known to those skilled in the art. Furthermore, those in the art will recognize that the components depicted in the exemplary embodiment may be varied for purposes of specific applications. For example, additional peripheral devices such as a CD-ROM drive may be incorporated into data processing system 114. In accordance with a preferred embodiment of the present invention, data processing system 114 includes accounting software such as a personal finance manager with the functionality described below.

Figure 2A:
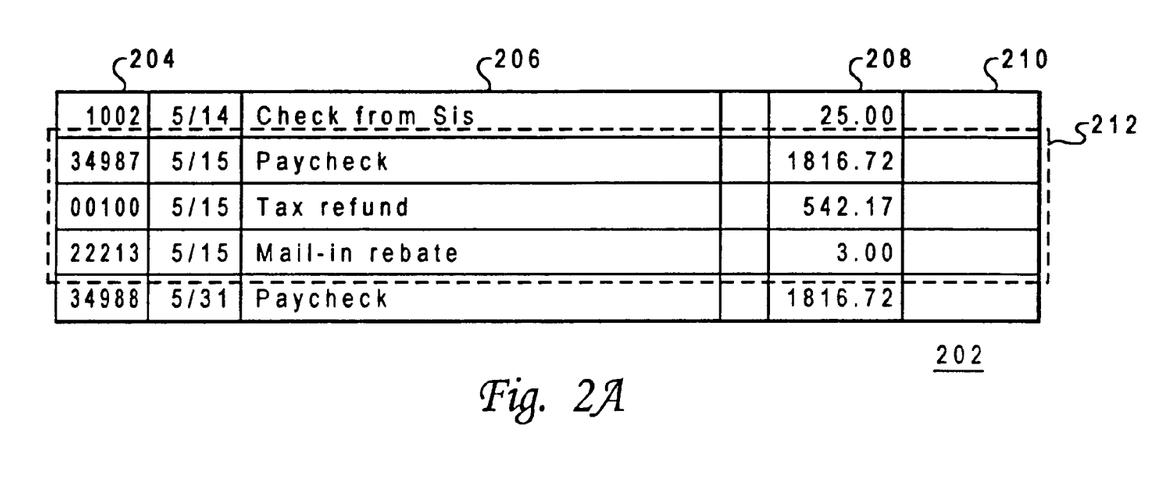
FIGS. 2A-2B are pictorial representations of transaction entries for accounting software in accordance with a preferred embodiment of the present invention.

Referring to FIG. 2A, a pictorial representation of transaction entries within an account ledger for accounting software in accordance with a preferred embodiment of the present invention is illustrated. The view depicted may be employed by the user interface of the accounting package to graphically represent the transaction entries.

In the example depicted, the display 202 of transaction entries includes column 204 for transaction identifiers, such as a check number. Column 206 is provided for a description of the transactions, while an amount for the transactions may be entered in column 208. An additional column 210 may display the total for a range of transactions, selected as described below.

The accounting software of the present invention provides support for "transaction groups," user selected groups of multiple transactions for which an association is persistently maintained. In the case of a deposit of multiple checks, for example, the user, when entering the individual checks as transactions in the software accounting ledger, would be aware that all of the checks were going to be deposited at one time and would therefore appear on the bank statement as a single entry. The user may therefore "rubber band" 212 the multiple transactions by a click-and-swipe select, or use any other form of multi-select such as clicking on each transaction while holding the CTRL, ALT, or SHIFT key.

After the user selects the multiple transaction entries expected to appear as a single deposit, the user then actuates a "Group Selected Entries" option. Actuation of this option would create a persistent association of the transaction records within the accounting software data records utilizing methods known in the art. As a specific example, if the accounting software employs an object oriented user interface, a container object may be instantiated to contain the data records associated with the selected transactions. The persistent association of transaction records creates a transaction group having a dual character: it may be treated as a single transaction, with a group transaction total being displayed or otherwise employed, or it may be treated as a plurality of individual transactions, with individual transaction records for each transaction. Treatment of the transaction group may thus be selectively altered depending on which treatment best suits a particular purpose.

In the exemplary embodiment of the present invention described in connection with FIGS. 1A-1B above, the persistent association of transactions to form a transaction group is best maintained within a local account ledger in user unit 102. For automated reconciliation with bank records maintained in server 110, the transaction group appears to be and is treated like any other single transaction. Functionality within user unit 102, activated at the end of an automated reconciliation process, may make appropriate modifications to the records for individual transactions belonging to group transactions which have been reconciled. As a specific example, the state of the individual transactions (reconciled or unreconciled) may be changed by altering a flag associated with the transactions.

Figure 2B:
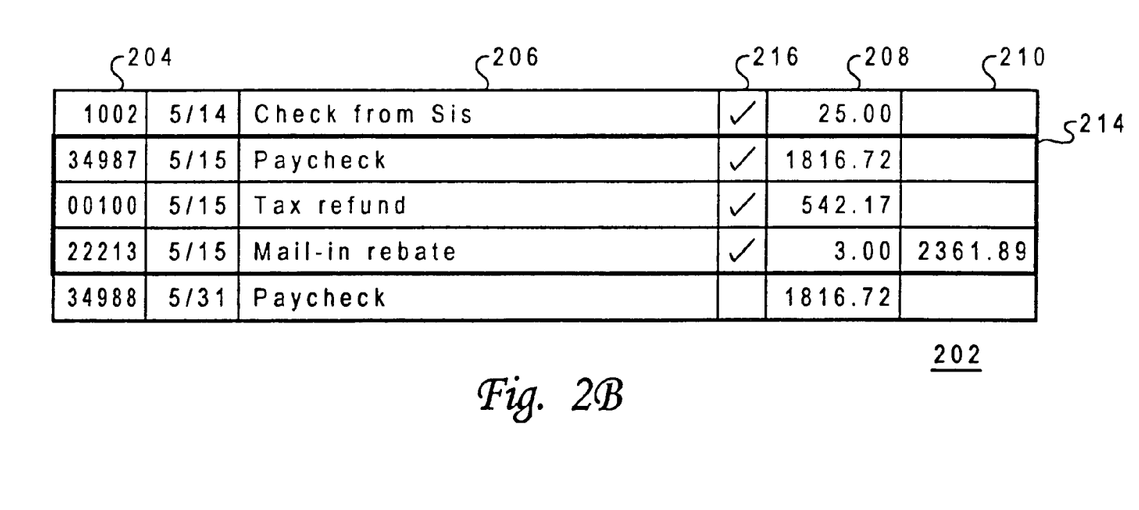

Once the transactions have been associated as a group, the accounting software may optionally provide a visual cue to the transaction group, such as the highlighted outline 214 depicted in FIG. 2B. Other known methods of visually distinguishing the transaction group from other displayed data records may also be utilized.

As depicted in FIG. 2B, a visual que 216 may also be provided to the user regarding the state of individual transactions. In the depicted embodiment, a check mark is displayed for those transactions which have been reconciled. The functionality described above for modifying records associated with individual transactions within a transaction group may result in a change of the indicated state for the individual transactions. Thus, individual transactions within a transaction group 214 will reflect a uniform condition, either all reconciled or all unreconciled.

Figure 3:
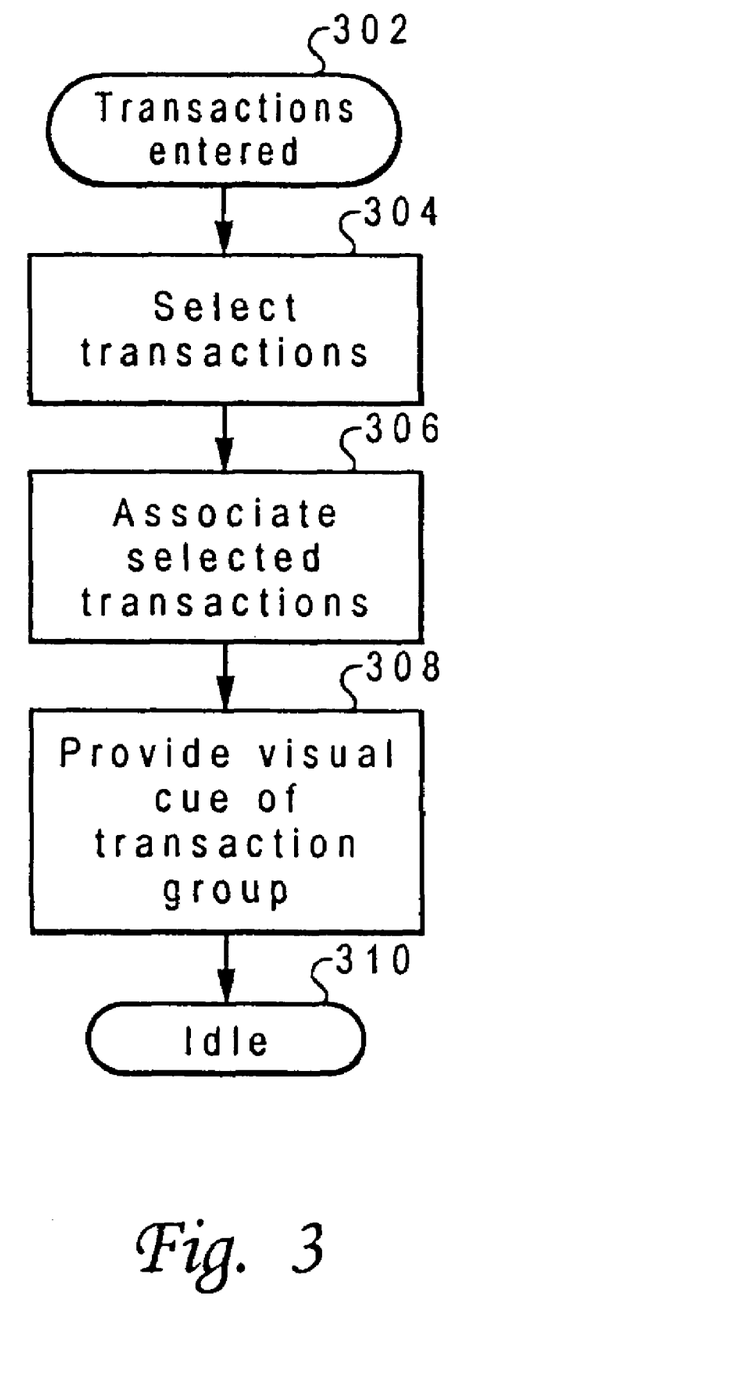
FIG. 3 depicts a high level flowchart for a method of creating transaction groups in accordance with a preferred embodiment of the present invention.

With reference now to FIG. 3, a high level flowchart for a method of creating transaction groups in accordance with a preferred embodiment of the present invention is depicted. The process begins as step 302, which depicts the transactions being entered by the user. The process next passes to step 304, which illustrates selection of the transactions to be grouped, and then to step 306, which depicts associating the data records corresponding to the selected transactions within the database of the accounting software. The process passes to step 308, which illustrates the optional step of providing a visual cue to the transaction group, and then to step 310, which depicts the process becoming idle until another transaction group is to be created.

Figure 4A:
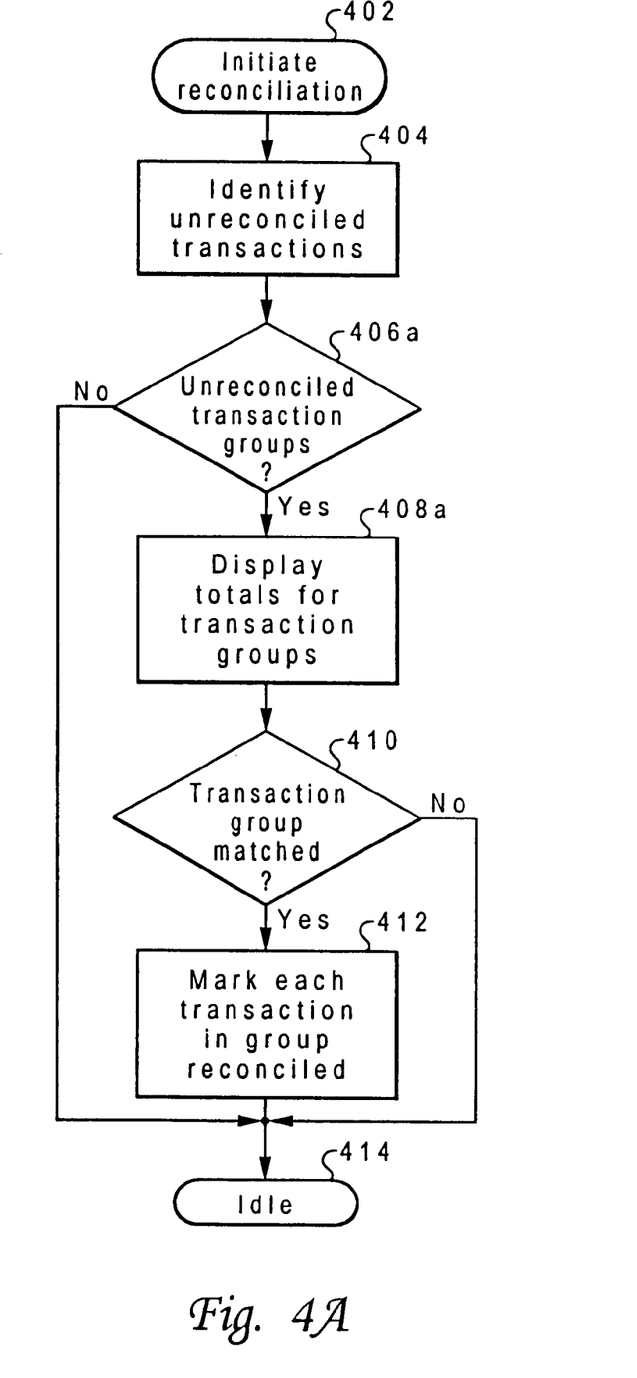
FIGS. 4A-4B are high level flowcharts for a method of reconciling data records with an external statement or records in accordance with a preferred embodiment of the present invention.
Figure 4B:
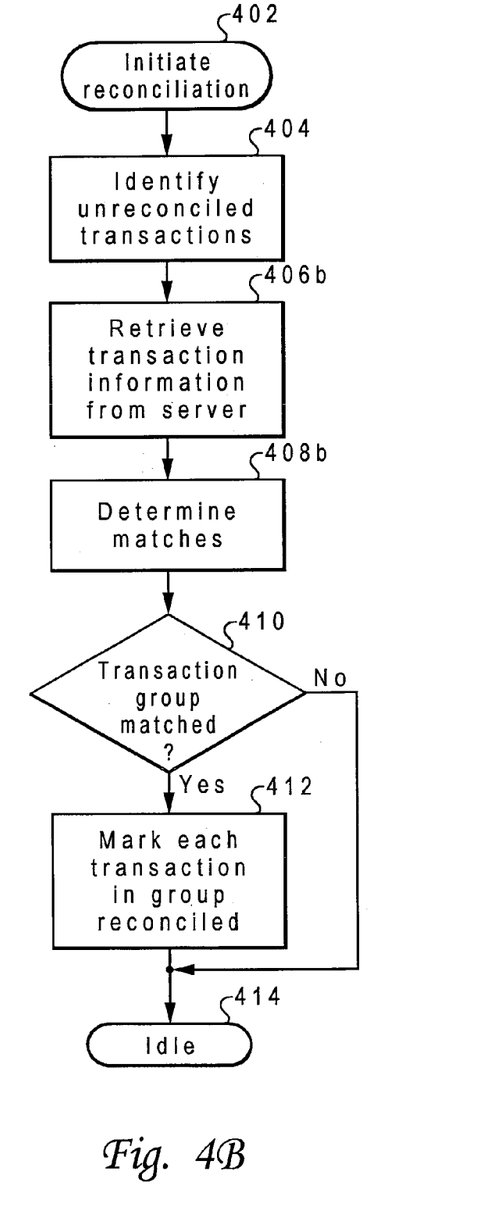

Referring to FIGS. 4A-4B, high level flowchart for a method of reconciling data records with an external statement in accordance with a preferred embodiment of the present invention is illustrated. FIG. 4A depicts the process implemented for manual account reconciliation. The process begins at step 402, which depicts initiation of reconciliation of the accounting software data records with the external statement. The process then passes to step 404, which illustrates identification of unreconciled transactions within the data records of the accounting software.

The process next passes to step 406a, which depicts a determination of whether the unreconciled transactions within the accounting package data records include any transaction groups. If so, the process proceeds to step 408a, which illustrates displaying the totals for the transaction groups for the user to match with entries in the external statement. If not, however, the process simply proceeds to step 414, described below.

From step 408a, the process next passes to step 410, which depicts a determination of whether the user has indicated a match between any transaction group and an entry in the external statement. If so, the process proceeds to step 412, which illustrates marking each transaction in the transaction group reconciled. If not, the process passes to step 414, which depicts the process becoming idle until a subsequent reconciliation is initiated. Note that steps 410 and 412 would be performed for every transaction group within the accounting software data records which the user indicates matches an entry in the external statement.

FIG. 4B depicts the process implemented for automated account reconciliation in the exemplary embodiment depicted in FIGS. 1A-1B. The reconciliation is initiated (step 402) and unreconciled transactions within the local ledger in a user unit ("user transaction records") are identified (step 404). The process then passes to step 406b, which illustrates retrieving transaction records from the server located at the account holder's bank. This step may be accomplished, for example, by copying selected information from the bank's transaction records (such as the date and amount of the unreconciled transactions) into a small, searchable database which is then transmitted from the server to the user's data processing system. Limitations on the transaction information retrieved may be employed to keep the retrieval manageable, such as only retrieving information relating to transactions dated after the last bank statement was mailed or after the last reconciliation. The retrieval process may be initiated by a request formatted in HTML.

The process then passes to step 408b, which depicts determining any matches which may be ascertained between the information from the user transaction records and any corresponding information in the account transaction records maintained at the bank's server. The process then passes to step 410 and subsequent steps, described above.

The present invention allows individual transactions to be selectively grouped at the time of entry for treatment as a single transaction for reconciliation purposes. Accounting software employing the present invention may thus maintain more information regarding the transactions and reduce the time and effort required to reconcile accounts with an external statement or records. The present invention may be employed whenever transactions are expected to be consolidated in an external statement or records.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links. In particular, the present invention may be employed in connection with Internet-based banking.

While the invention has been particularly shown and described with reference to a preferred embodiment, it will be understood by those skilled in the art that various changes in form and detail may be made therein without departing from the spirit and scope of the invention.

What is claimed is:

1. An apparatus facilitating account statement reconciliation, comprising:
   association means persistently associating selected transactions within data records of an account to form a transaction group which is treated as a single transaction, wherein the selected transactions were paid or deposited together; and
   display means for displaying a total of the transaction group when the selected transactions within the transaction group are individually displayed, wherein the total of the transaction group can be readily reconciled with a consolidated entry in an external account statement.

2. The apparatus of claim 1, further comprising:
   indication means for displaying a visual indicator of the association of the selected transactions within and forming the transaction group when the selected transactions within the transaction group are individually displayed.

3. A computer program product use with a data processing system, comprising:
- a first instruction set embodied within a computer usable medium associating selected transactions within data records of an account to form a persistent transaction group having a data record distinct from data records for the selected transactions, allowing the transaction group to be selectively treated as either a single transaction or as a plurality of individual transactions, wherein the selected transactions were paid or deposited together; and
- a second instruction set embodied within a computer usable medium displaying a total of the transaction group when the selected transactions within the transaction group are individually displayed, wherein the total of the transaction group can be readily reconciled with a consolidated entry in an external account statement.

4. The computer program product of claim 3, further comprising:
- a third instruction set embodied within a computer usable medium for displaying a visual indicator of the association of the selected transactions within the transaction group when the selected transactions within the transaction group are individually displayed.

* * * * *